US012804719B2

(12) United States Patent
Gao et al.

(10) Patent No.: US 12,804,719 B2
(45) Date of Patent: Nov. 17, 2026

(54) SYSTEMS AND METHODS FOR ENHANCED RANDOM ACCESS PROCEDURE

(71) Applicant: ZTE CORPORATION, Shenzhen (CN)

(72) Inventors: Yuan Gao, Shenzhen (CN); He Huang, Shenzhen (CN); Zhihong Qiu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 279 days.

(21) Appl. No.: 18/640,297

(22) Filed: Apr. 19, 2024

(65) Prior Publication Data

US 2024/0397552 A1 Nov. 28, 2024

Related U.S. Application Data

(63) Continuation of application No. PCT/CN2021/125528, filed on Oct. 22, 2021.

(51) Int. Cl.
*H04W 74/0833* (2024.01)

(52) U.S. Cl.
CPC ................................ *H04W 74/0833* (2013.01)

(58) Field of Classification Search
CPC ................................................ H04W 74/0833
See application file for complete search history.

(56) References Cited

U.S. PATENT DOCUMENTS

2021/0289460 A1* 9/2021 Medles ............. H04W 72/1268
2022/0086780 A1* 3/2022 Tsai .................... H04W 56/006
2022/0124795 A1* 4/2022 Wu ................... H04W 56/0045
2023/0189179 A1* 6/2023 Kunt ................... H04W 56/004
2023/0388952 A1* 11/2023 Khoshkholgh Dashtaki ............... H04B 7/18513

FOREIGN PATENT DOCUMENTS

CN 113382440 A 9/2021
EP 4099602 A1 * 12/2022 ........... H04L 5/0053
EP 4195797 A1 * 6/2023 ........ H04W 56/0045

OTHER PUBLICATIONS

Caict, "Timing relationship enhancements to support NTN", 3GPP TSG RAN WG1 #106b-e R1-2109343, Oct. 19, 2021, e-Meeting (10 pages).
Notice of Reasons for Rejection for JP Appl. No. 2024-523432 dated May 7, 2025 (with English translation 6 pages).
Xiaomi, "RACH Type selection and TA report", 3GPP TSG RAN WG2 #116-e R2-2110019, Nov. 12, 2021, e-Meeting (6 pages).
Asia Pacific Telecom et al., "Discussion on UE-specific TA report" 3GPP TSG-RAN WG2 Meeting #114 electronic, R2-2104966, May 27, 2021, Online (4 pages).

(Continued)

*Primary Examiner* — Erika A Washington
(74) *Attorney, Agent, or Firm* — Foley & Lardner LLP

(57) ABSTRACT

Presented are systems and methods for enhanced random access procedure. A wireless communication device may receive a first message to enable sending a User Equipment (UE) specific timing advance (TA) value from a wireless communication node. The wireless communication device may send a second message including a report containing the UE specific TA value to the wireless communication node.

6 Claims, 11 Drawing Sheets

(56) References Cited

OTHER PUBLICATIONS

Asia Pacific Telecom et al., "Triggering of UE-specific TA report" 3GPP TSG-RAN WG2 Meeting #113 bis electronic, R2-2103261, Apr. 20, 2021, Online (4 pages).
International Search Report and Written Opinion for PCT Appl. No. PCT/CN2021/125528, mailed Jun. 9, 2022 (8 pages).
Catt, "Discussion on UE-specific TA Report", 3GPP TSG-RAN WG2 Meeting #115-e, R2-2107314, Aug. 27, 2021, Electronic meeting (2 pages).
Extended European Search Report for EP Appl. No. 21961026.8, dated Feb. 10, 2025 (13 pages).
Mediatek Inc., "Timing relationship enhancements for IoT-IoT Ntn", 3GPP TSG RAN WG1 Meeting #106-e, R1-2107068, Aug. 27, 2021, e-Meeting (8 pages).
Mediatek Inc., "Timing relationship enhancements for NR-NTN", 3GPP TSG RAN WG1 Meeting #102e, R1-2005495, Aug. 28, 2020 (6 pages).
ZTE, "Discussion on timing relationship for IoT-NTN", 3GPP TSG RAN WG1 #106b-e, R1-2109848, Oct. 19, 2021, e-Meeting (6 pages).

* cited by examiner

SYSTEMS AND METHODS FOR ENHANCED RANDOM ACCESS PROCEDURE

CROSS-REFERENCE TO RELATED APPLICATION

This application claims the benefit of priority under 35 U.S.C. § 120 as a continuation of PCT Patent Application No. PCT/CN2021/125528, filed on Oct. 22, 2021, the disclosure of which is incorporated herein by reference in its entirety.

TECHNICAL FIELD

The disclosure relates generally to wireless communications, including but not limited to systems and methods for enhanced random access procedure.

BACKGROUND

In the 5th Generation (5G) New Radio (NR) mobile networks, before a user equipment (UE) can send data to a base station (BS), the UE is required to obtain uplink synchronization and downlink synchronization with the BS. The uplink timing synchronization can be achieved by performing a random access procedure. To meet the demand for faster and efficient communications, the random access procedure is to be enhanced.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a first message to enable sending a User Equipment (UE) specific timing advance (TA) value from a wireless communication node. In response to receiving the first message, the wireless communication device can send a second message including a report containing the UE specific TA value to the wireless communication node.

In some implementations, the first message may be included in: a System Information Block 1 (SIB1), an RRCSetup message, an RRCResume message, or an RRCReestablishment message. The second message may be sent prior to a contention resolution of a random access procedure between the wireless communication device and the wireless communication node. The second message may be transmitted via a Medium Access Control (MAC) Control Element (CE) or an Uplink (UL) Common Control Channel (CCCH). Prior to or subsequent to sending the second message, the wireless communication device can send a third message including a scheduled transmission for the random access procedure to the wireless communication node.

In some implementations, the second message can be sent prior to a contention resolution of a random access procedure between the wireless communication device and the wireless communication node. A size of a portion of the second message that contains UE ID may be reduced. The second message may be transmitted via an Uplink (UL) Common Control Channel (CCCH) or an Uplink (UL) Common Control Channel 1 (CCCH1). The second message can include at least one of: an RRCSetupRequest1 message, an RRCResumeRequest2 message, or an RRCReestablishmentRequest1 message.

In some implementations, the second message may be sent subsequently to a contention resolution of a random access procedure between the wireless communication device and the wireless communication node. The second message may be transmitted via a Dedicated Control Channel (DCCH). The second message can include at least one of: an RRCSetupComplete message, an RRCResumeComplete message, or an RRCRestablishmentComplete message.

At least one aspect is directed to a system, method, apparatus, or a computer-readable medium. A wireless communication node may transmit a first message to enable sending a User Equipment (UE) specific timing advance (TA) value to a wireless communication device. Subsequent to transmitting the first message, the wireless communication node can receive a second message including a report containing the UE specific TA value from the wireless communication device.

The systems and methods presented herein include a novel approach for enhanced random access procedure. Specifically, the systems and methods presented herein discuss a novel solution for time-delay compensation during UE's transmission of the uplink signal. For instance, the UE can receive an indication to enable UE specific timing advance report. The UE can report the UE-specific timing advance (TA) value during the random access (RA) procedure. The indication to enable UE specific timing advance report can be transmitted via at least one of SIB1, RRCSetup message, RRCResume message, or RRCReestablishment message. In some cases, the UE may report the UE-specific TA via a MAC CE or an radio resource control (RRC) message to be transmitted to the network (NW) before the contention resolution. In some other cases, the UE can report the UE-specific TA via at least one of RRCSetupComplete, RRCResumeComplete, or RRCReestablishmentComplete messages. In some implementations, the UE can report the UE-specific TA via the aforementioned message but is not limited to the message discussed herein.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
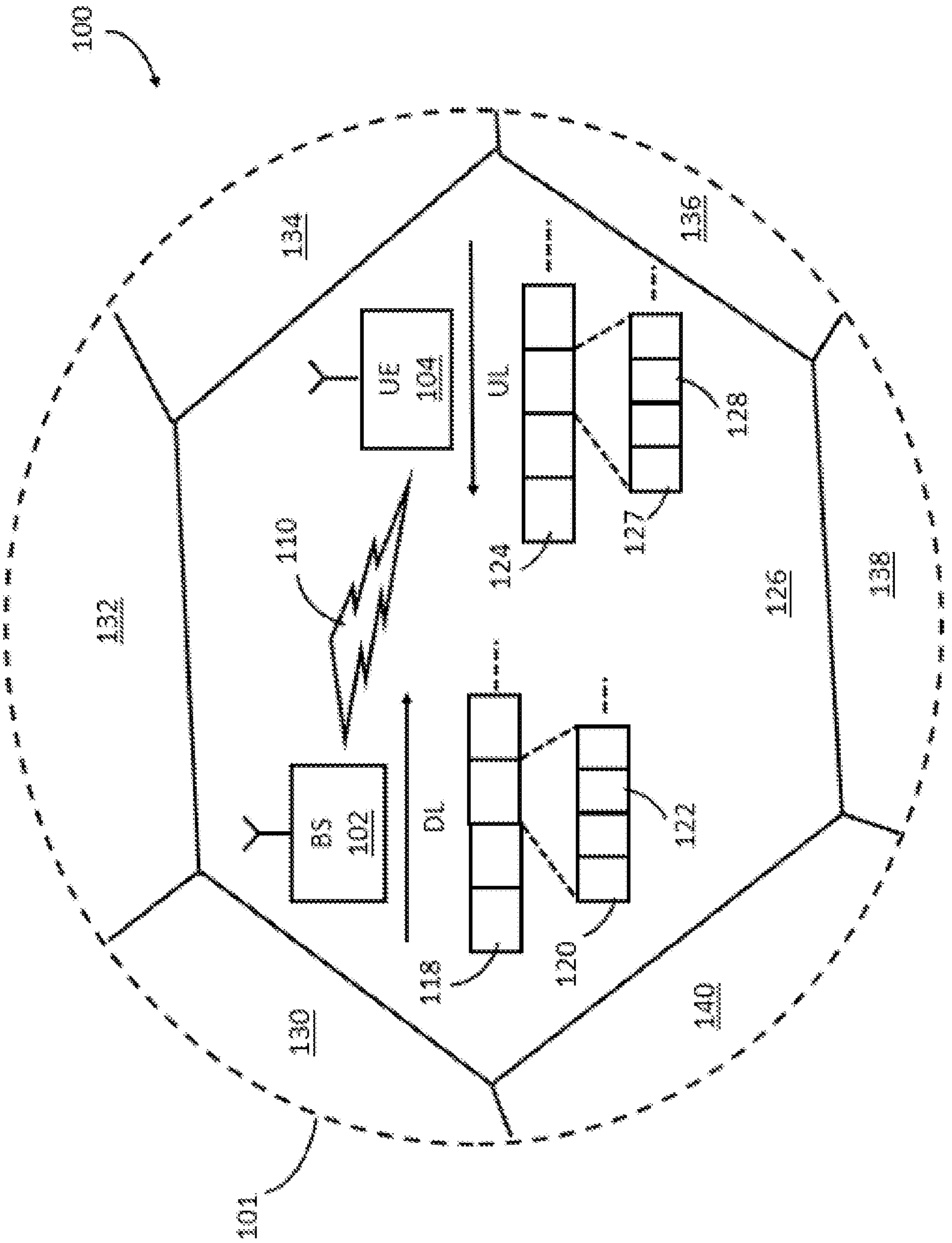
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
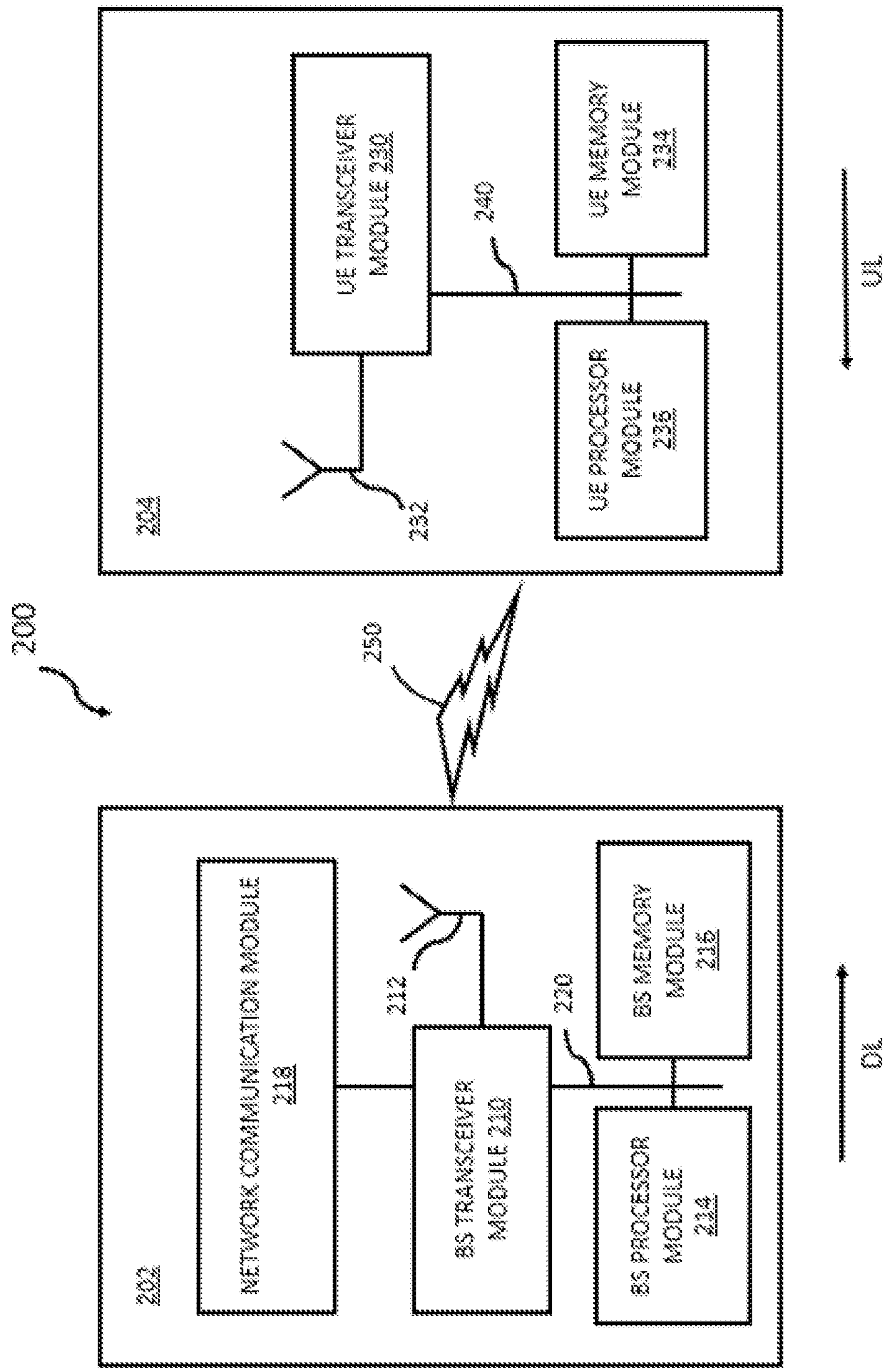
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (cNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Enhanced Random Access Procedure

In certain systems, UE can compensate timing advance (TA) on the UE-side. In this case, the network should be aware of the UE-specific TA to assist the uplink (UL) and/or downlink (DL) scheduling. Further, the UE may report the information (e.g., UE-specific TA) during the random access (RA) procedure.

Referring generally to FIGS. 3-7, depicted are examples of contention-based random access (CBRA) and contention-free random access (CFRA) with 4-step RA procedure/type and 2-step RA type, in accordance with some implementations. In certain systems, two types of RA procedures can be supported for accessing resources (e.g., RACH resources). For example, the two types can include 4-step RA type with MSG1 (e.g., message 1 or first message) and 2-step RA type with MSGA (e.g., message A). In certain other systems, the types may not be limited to the 4-step and/or 2-step RA types.

Figure 3:
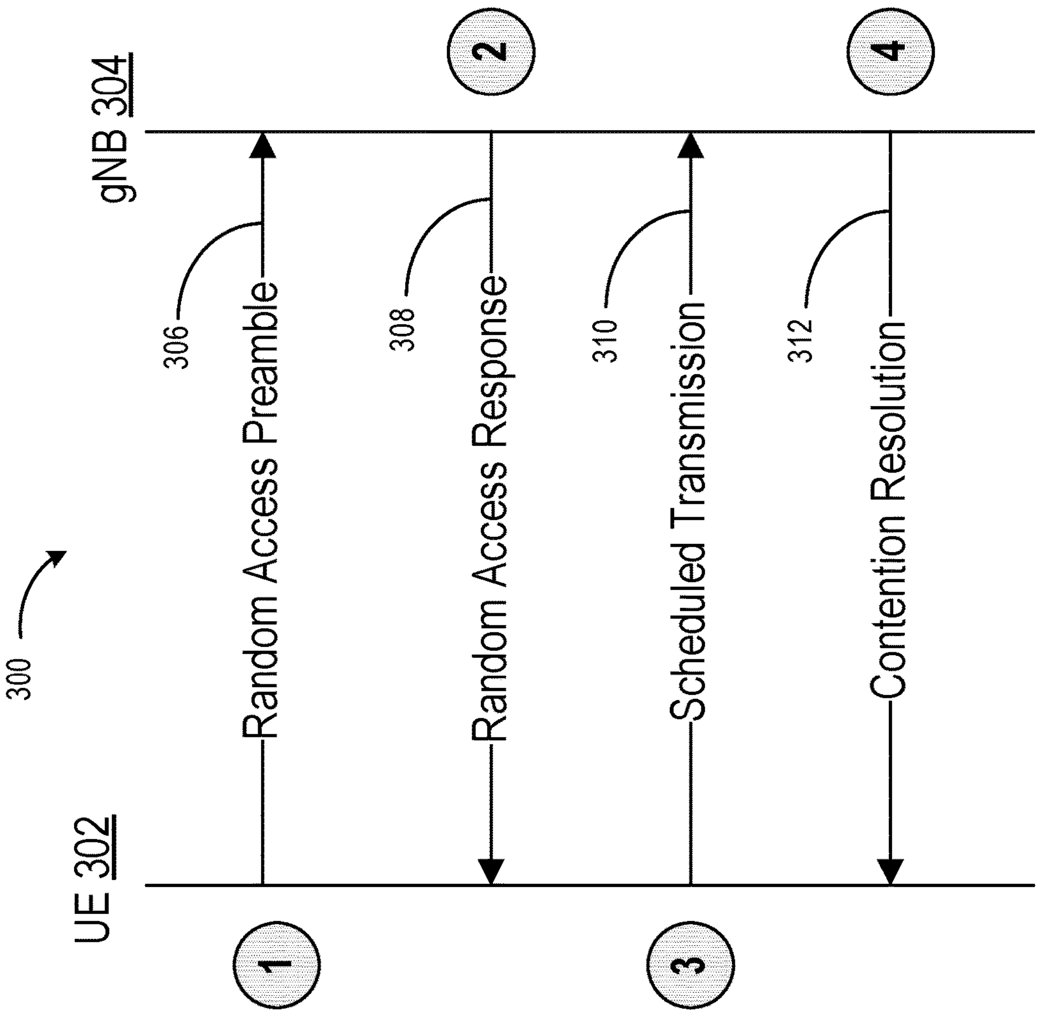
FIG. 3 illustrates an example contention-based random access (CBRA) with 4-step random access (RA) procedure/type, in accordance with some embodiments of the present disclosure.

Referring now to FIG. 3, depicted is an example contention-based random access (CBRA) with 4-step RA procedure/type, in accordance with some embodiments of the present disclosure. The CBRA with 4-step RA procedure (RACH) 300 is performed between a base station (BS) 304 (e.g., a gNB) and a UE 302. BS 304 and UE 302 may be the same or similar to BS 202 and UE 204 in FIG. 2, respectively. In some embodiments, at Step 1 (306), the UE 302 transmits a random access channel (RACH) preamble or physical random access channel (PRACH) preamble in message 1 (MSG1) through an uplink random access channel (RACH) to the BS 304. At Step 2 (308), once the preamble is received successfully by the BS 304, the BS 304 sends a message 2 (MSG2) back to the UE 302, in which a medium access control (MAC) random access response (RAR) can be included as a response to the preamble. MSG2 may be a response message transmitted by the BS 304 and received by the UE 302. At Step 3 (310), once the MAC RAR with a corresponding random access preamble (RAP) identifier (ID) is received, the UE 302 can transmit a message 3 (MSG3) to the BS 304 with the grant carried in the MAC RAR (e.g., using UL grant scheduled in the RA response). The UE 302 can transmit MSG3 to the BS 304 for scheduling transmission of the RA procedure. The UE 302 can monitor contention resolution. At Step 4 (312), once the MSG3 is received, the BS 304 sends a message 4 (MSG4) to the UE 302, in response to receiving MSG3 (e.g., second response message). MSG4 can include contention resolution ID can be included for the purpose of contention resolution. In some implementations, if contention resolution is not successful after MSG3 transmission(s)/retransmission(s), the UE 302 may retransmit or go back to MSG1. In some implementations, to reduce latency and accelerate the initial access procedure, a 2-step random access procedure can be used, as described in conjunction with FIG. 4 below.

Figure 4:
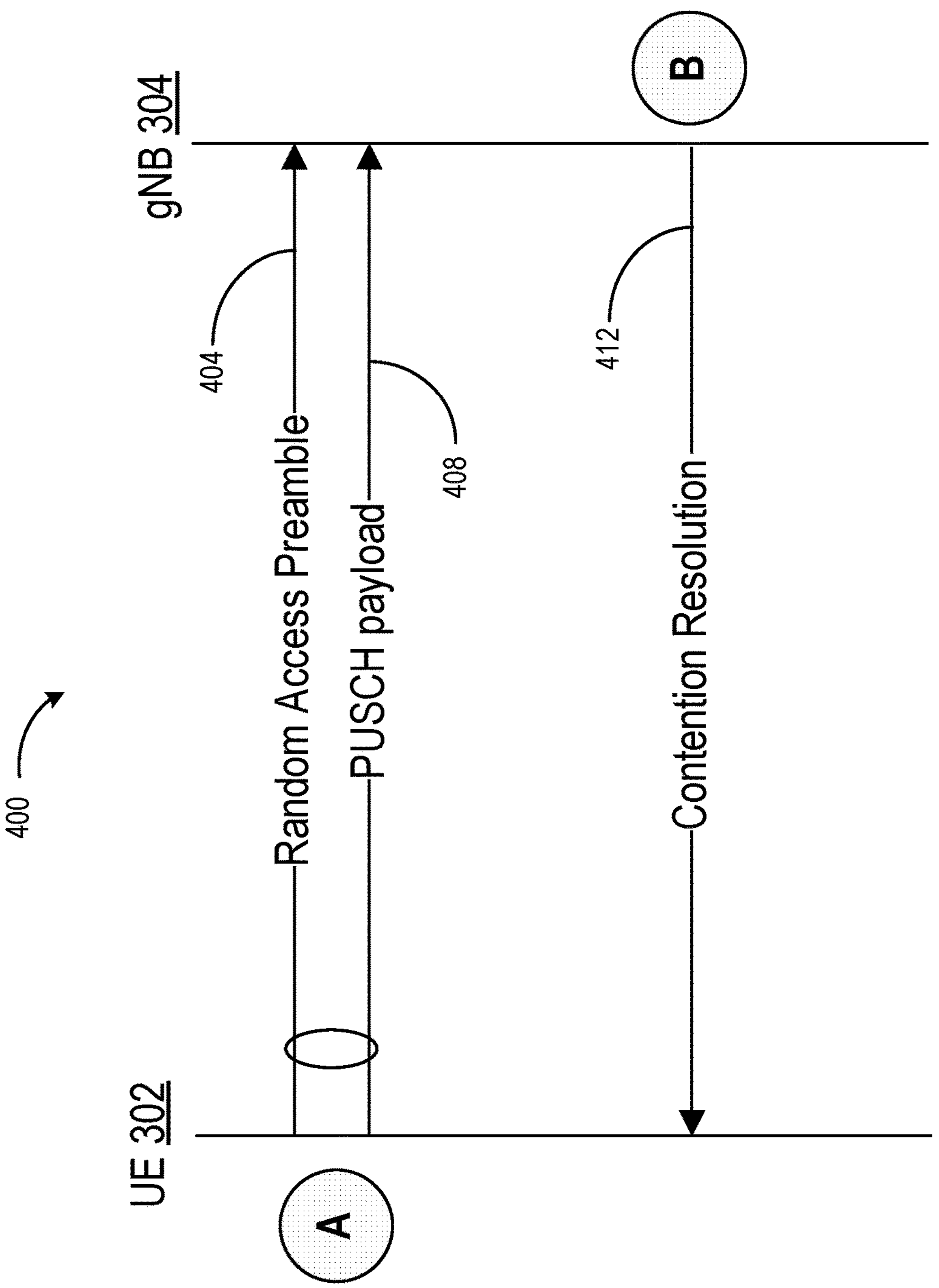
FIG. 4 illustrates an example CBRA with 2-step RA procedure, in accordance with some embodiments of the present disclosure.

FIG. 4 illustrates an example CBRA with 2-step RA procedure, in accordance with some embodiments of the present disclosure. In some implementations, a 2-step random access procedure (RACH) 400 can complete the four steps in FIG. 3 in two messages or two steps. In some implementations, at least some content of the MSG1 and MSG3 from the 4-step RACH may be included in MSG1 of the 2-step RACH, and at least some content of the MSG2 and MSG4 (RAR and contention resolution) in the 4-step RACH may be included in MSG2 of the 2-step RACH. For instance, the 2-step random access procedure 400 can be performed between a BS 304 (e.g., a gNB) and a UE 302. The BS 304 and UE 302 may be the same or similar to BS 202 and UE 204 in FIG. 2, respectively. In some implementations, the UE 302 can transmit MSGA including a preamble (e.g., RA preamble) (404) and a data payload (e.g., physical uplink channel (PUSCH) payload) (408) to a BS 304 for access to the BS 304. In some implementations, the payload may be optional. In some implementations, the preamble may be optional. In response to receiving MSGA, the BS 304 can transmit MSGB to the UE 302 (412). The MSGB can be a response message to MSGA or contention resolution for the UE 302 (e.g., the UE 302 monitoring for contention resolution). If contention resolution is successful upon receiving the response (e.g., network response), the UE 302 can end the random access procedure as shown in FIG. 1(*b*). Details of the 2-step RA procedure may be described in further detail herein.

Figure 5:
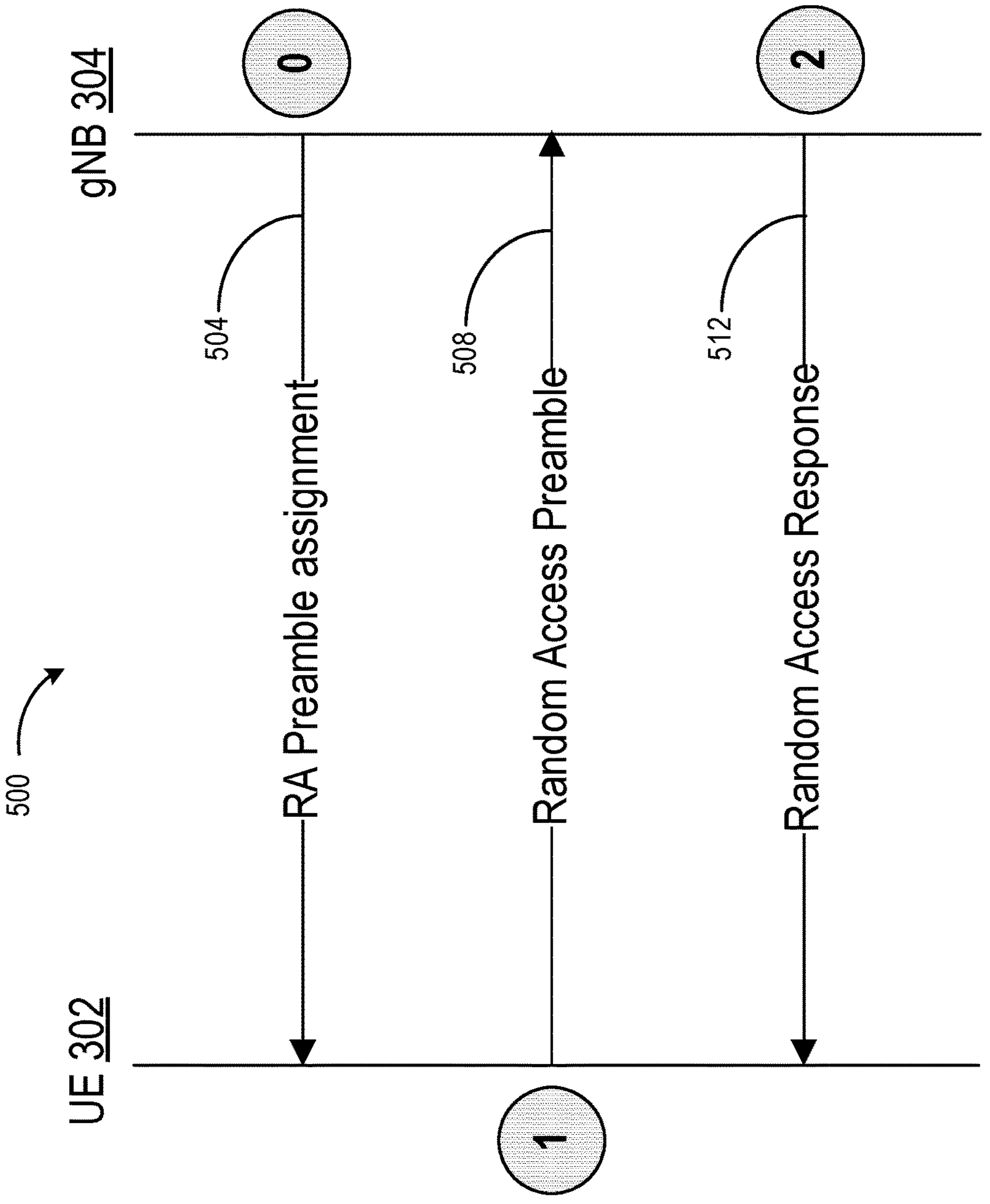
FIG. 5 illustrates an example contention-free random access (CFRA) with 4-step RA procedure, in accordance with some embodiments of the present disclosure.
Figure 6:
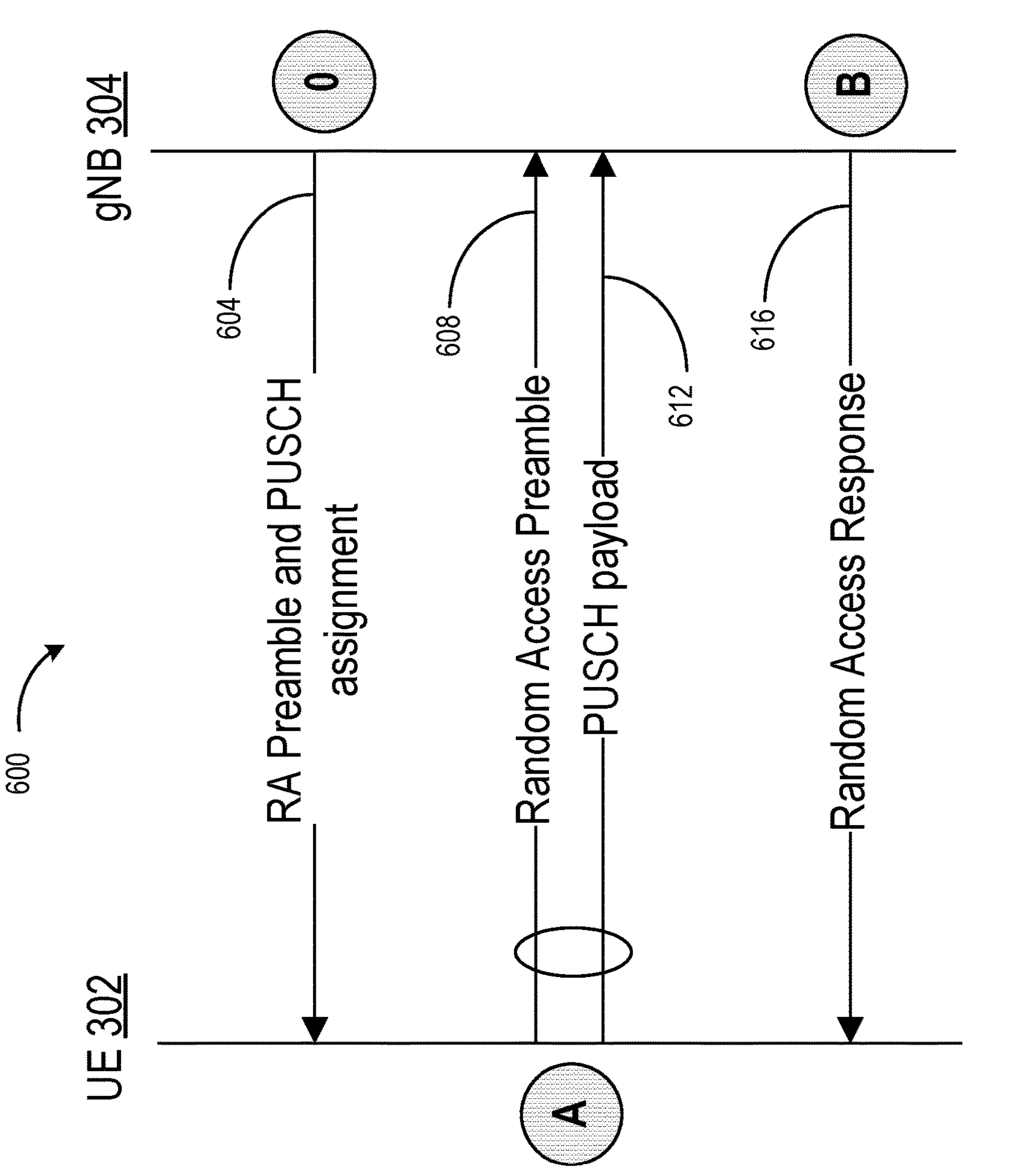
FIG. 6 illustrates an example CFRA with 2-step RA procedure, in accordance with some embodiments of the present disclosure.

FIG. 5 illustrates an example contention-free random access (CFRA) with 4-step RA procedure (500), in accordance with some embodiments of the present disclosure. The one or more messages (e.g., MSG0, MSG1, MSG2, etc.) may include information in addition to, corresponding to, or as part of one or more messages in conjunction with at least FIG. 3. At step 504, the BS 304 (e.g., gNB or NW) can transmit an RA preamble assignment (e.g., dedicated preamble) to the UE 302 as part of MSG0. The UE 302 can be allocated/assigned/provided with a portion of the resources from the BS 304 to transmit one or more subsequent messages to the BS 304. In response to receiving MSG0, the UE 302 can transmit MSG1 including the RA preamble to the BS 304 (508). Upon receiving MSG1, the BS 304 can transmit a response message or random access response to the UE 302 (512). In some implementations, the UE 302 can end the RA procedure in response to receiving the RA response from the BS 304. In some implementations, FIG. 6 illustrates an example CFRA with 2-step RA procedure (600), in accordance with some embodiments of the present disclosure. The one or more messages (e.g., MSG0, MSGA, MSGB, etc.) may include information in addition to, corresponding to, or as part of one or more messages in conjunction with at least FIGS. 4-5. The BS 304 can send/transmit/provide RA preamble and PUSCH assignment to the UE 302 as part of MSG0 (604). The UE 302 can receive MSG0 indicating that at least a portion of resources has been allocated or assigned to the UE 302. MSG0 can indicate the dedicated preamble for MSG1 transmission assigned by the BS 304/NW. In response to receiving MSG0, the UE 302 can transmit MSGA including at least RA preamble (608) and PUSCH payload (612) to the BS 304. In some cases, the UE 302 may not transmit the RA preamble. In some other cases, the UE 302 may not transmit the PUSCH payload. In response to receiving MSGA, the BS 304 can transmit RA response to the UE 302 (616). In some implementations, the UE 302 can end the RA procedure upon receiving the RA response.

Figure 7:
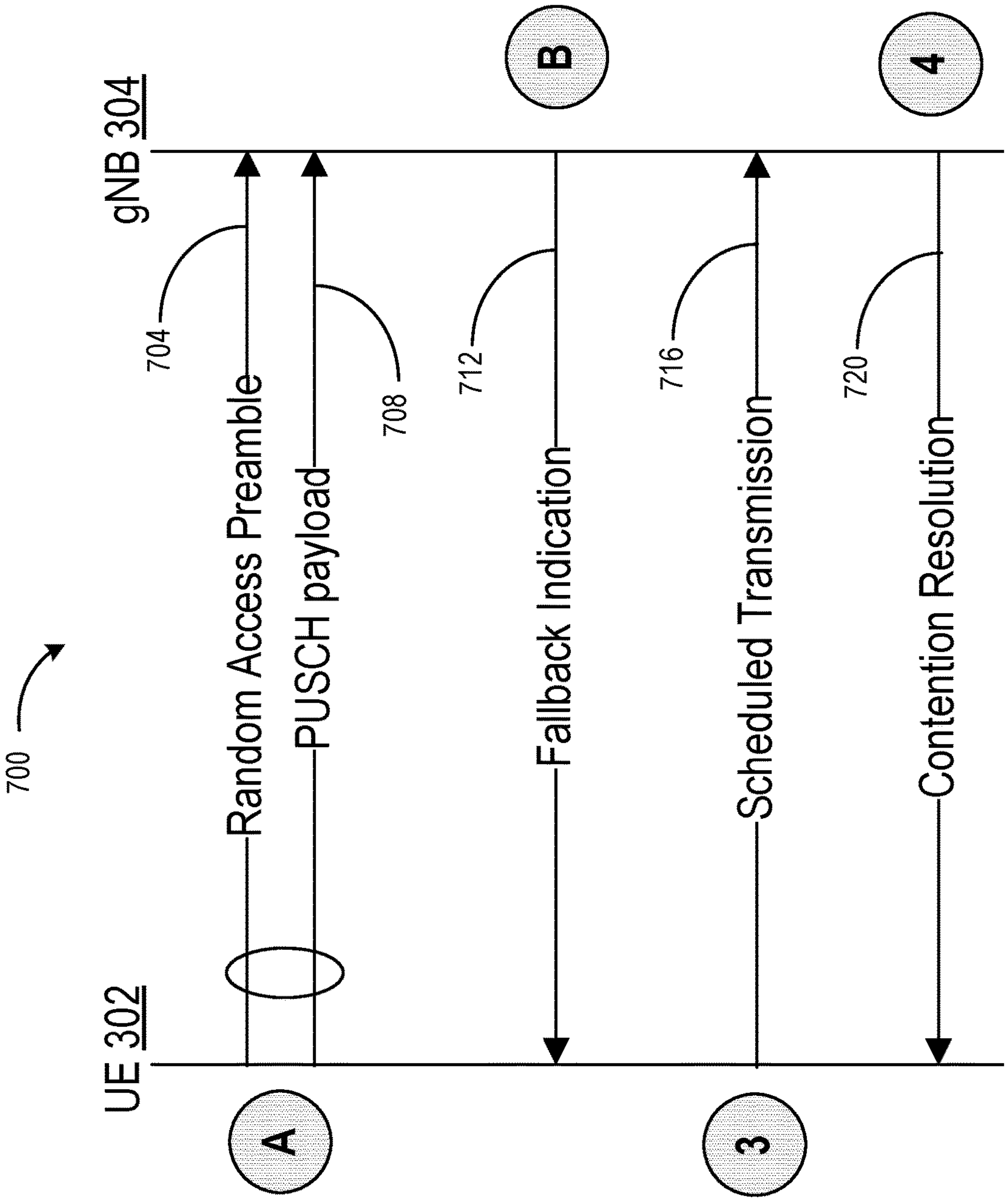
FIG. 7 illustrates an example fallback for CBRA with 2-step RA procedure, in accordance with some embodiments of the present disclosure.

FIG. 7 illustrates an example fallback for CBRA with 2-step RA procedure (700), in accordance with some embodiments of the present disclosure. The fallback for CBRA with 2-step RA procedure 700 may be performed between the UE 302 and the BS 304. The messages (e.g., MSGA, MSGB, MSG3, MSG4, etc.) transmitted between the UE 302 can the BS 304 can include, correspond to, or be a part of the messages as discussed in conjunction with at least FIGS. 3-4. The UE 302 can transmit the RA preamble (704) and PUSCH payload (708) as part of MSGA to the BS 304. In some cases, the BS 304 can transmit a fallback indication to the UE 302 as part of MSGB (712). If the fallback indication is received in MSGB, the UE 302 may perform MSG3 transmission using the UL grant scheduled in the fallback indication (716). The UE 302 can monitor for contention resolution from the BS 304. In response to receiving MSG3, the BS 304 can transmit the contention resolution (720) to the UE 302. If contention resolution is not successful after transmitting/retransmitting the MSG3, the UE 302 may revert back to MSGA transmission or perform at least one of steps 704 or 708. For example, in some cases, the UE 302 may not transmit the payload. In some other cases, the UE 302 may not transmit RA preamble.

In some implementations, in a non-terrestrial network (NTN), the UE 302 with location information can compensate the timing advance based on at least the location of the UE 302 and the evaluated transmission delay between UE 302 and the satellite, among other components or devices introducing the transmission delay. In certain systems, the BS 304 (e.g., gNB or network) may not be aware of the compensated value at the UE side. Therefore, the BS 304 may not be able to schedule UE 302 efficiently. Hence, the UE 302 can report at least the location information and the evaluated transmission delay to the BS 304 to enhance the efficiency of UE scheduling.

To compensate for the transmission delay between the UE 302 can the satellite, the UE 302 (e.g., wireless communication device) can receive an indication to enable UE-specific timing advance report from the BS 304 (e.g., wireless communication node, gNB, or network). For example, the indication to enable UE-specific timing advance report (sometimes generally referred to as a timing report) can be transmitted via at least one of SIB1, RRCSetup message, RRCResume message, or RRCReestablishment message. In some cases, the messages (e.g., SIB1, RRCSetup message, RRCResume message, or RRCReestablishment message) may be a part of or correspond to at least one of the MSG0, MSG1, MSG2, MSG3, MSG4, MSGA, MSGB, etc. as discussed in conjunction with at least FIGS. 3-7. Upon receiving the indication, the UE 302 can report the UE-specific timing advance (TA) value during the RA procedure to the BS 304. To report the UE-specific TA value, the UE 302 can consider/utilize one or more options (e.g., as follows) accounting for/based on certain conditions/parameters. In some implementations, the UE 302 can consider other options to perform features or functionalities to report the UE-specific TA value.

Example Option 1 for Reporting UE-Specific TA Value

In some implementations, the UE 302 can report the UE-specific TA via MAC CE or a UL common control channel (CCCH) message (e.g., newly generated/introduced) to be transmitted to the NW/BS 304. The MAC CE or UL CCCH message can be transmitted to the BS 304 before contention resolution. In this case, the UE 302 may transmit two MSG3 during the RA procedure. The first MSG3 can be for the first scheduled transmission of the RA procedure. The second MSG3 can include the UE-specific TA (e.g., TA value). To transmit the two MSG3 messages, the BS 304 can configure the UL grant for the two MSG3 transmissions before contention resolution.

A new value/codepoint/index of the logical channel ID (LCID) for the UL-shared channel (UP-SCH) for the MAC CE transmission of UE-specific TA report can be predetermined/provided/configured for the UE 302 and the BS 304. For example, the UE 302 and/or the BS 304 can be configured with the new LCID value from a reserved code point or index (e.g., 35-44, 47, etc.) for usage for the MAC CE. Examples of LCID values can include the following values, as in Table 1. The LCID value may include other values in addition to the example provided in Table 1.

TABLE 1

| Codepoint/ Index | LCID values |
|---|---|
| 0 | CCCH of size 64 bits (referred to as “CCCH1” in TS 38.331 [5]) |
| 1-32 | Identity of the logical channel |
| 33 | Extended logical channel ID field (two-octet eLCID field) |
| 34 | Extended logical channel ID field (one-octet eLCID field) |
| 35-44 | Reserved |
| 45 | Truncated Sidelink BSR |
| 46 | Sidelink BSR |
| 47 | Reserved |
| 48 | LBT failure (four octets) |
| 49 | LBT failure (one octet) |
| 50 | BFR (one octet $C_i$) |
| 51 | Truncated BFR (one octet $C_i$) |
| 52 | CCCH of size 48 bits (referred to as “CCCH” in TS 38.331 [5]) |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

Figure 8:
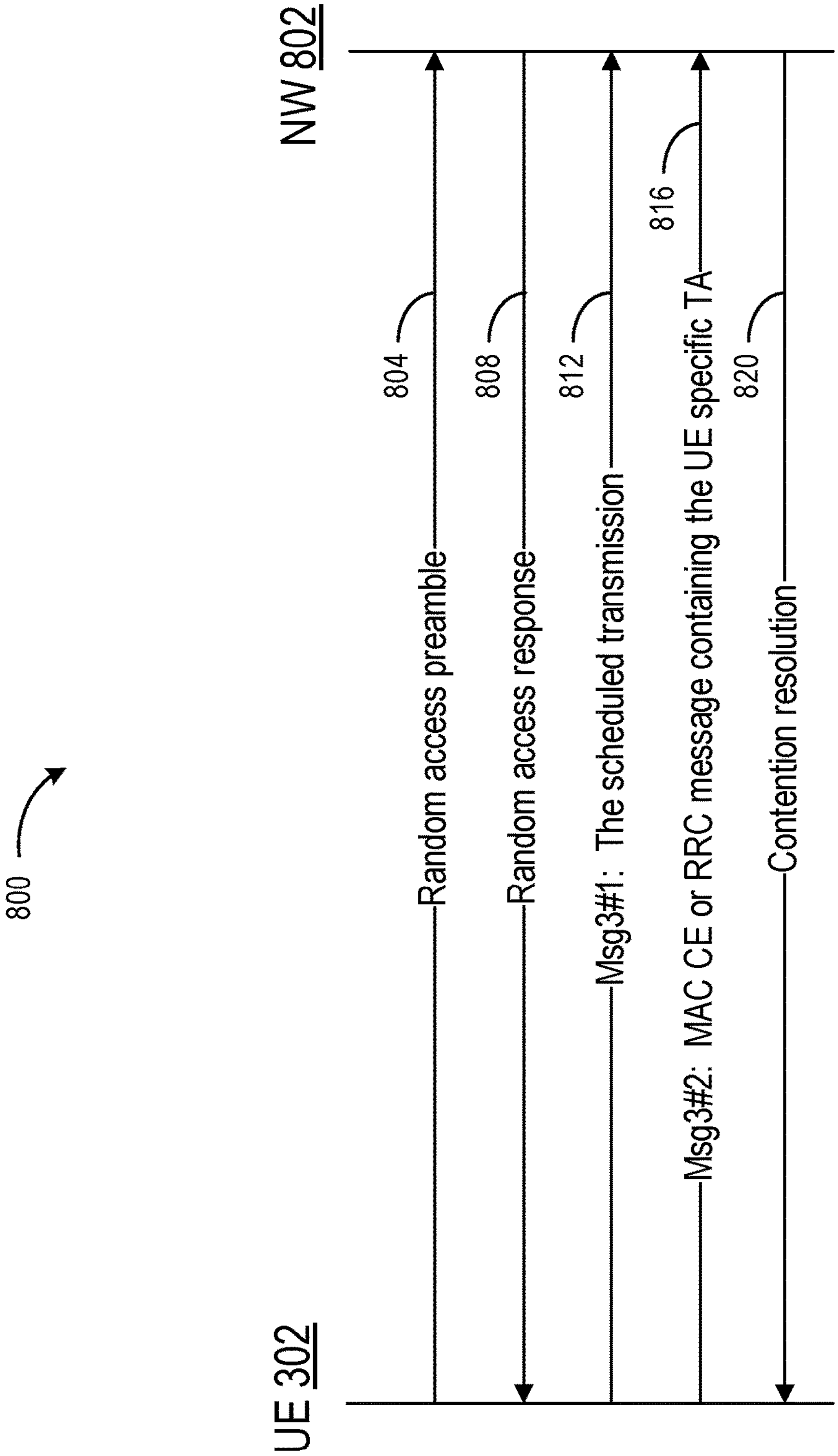
FIGS. 8-9 illustrate examples of message transmission containing the UE-specific TA, in accordance with some embodiments of the present disclosure.

Referring to FIG. 8, a first example of message transmission containing the UE-specific TA (800), in accordance with some embodiments of the present disclosure. In some implementations, the first MSG3 can be the first scheduled transmission of the RA procedure. For example, the UE 302 can transmit the RA preamble to the NW 802 (804). The NW 802 can include features or functionalities or correspond to the BS 304, such as in conjunction with at least FIGS. 3-7. The NW 802 can transmit an RA response to the UE 302 upon receiving the RA preamble (808). In this case, the UE 302 can transmit a first MSG3 including the first scheduled transmission to the NW 802 (812). Concurrent to/while/during the transmission of the first MSG3, the UE 302 can transmit/send/forward a second MSG3, which can be a MAC CE or RRC message including the UE-specific TA. Accordingly, the UE 302 can receive a response message (e.g., contention resolution) from the NW 802.

Figure 9:
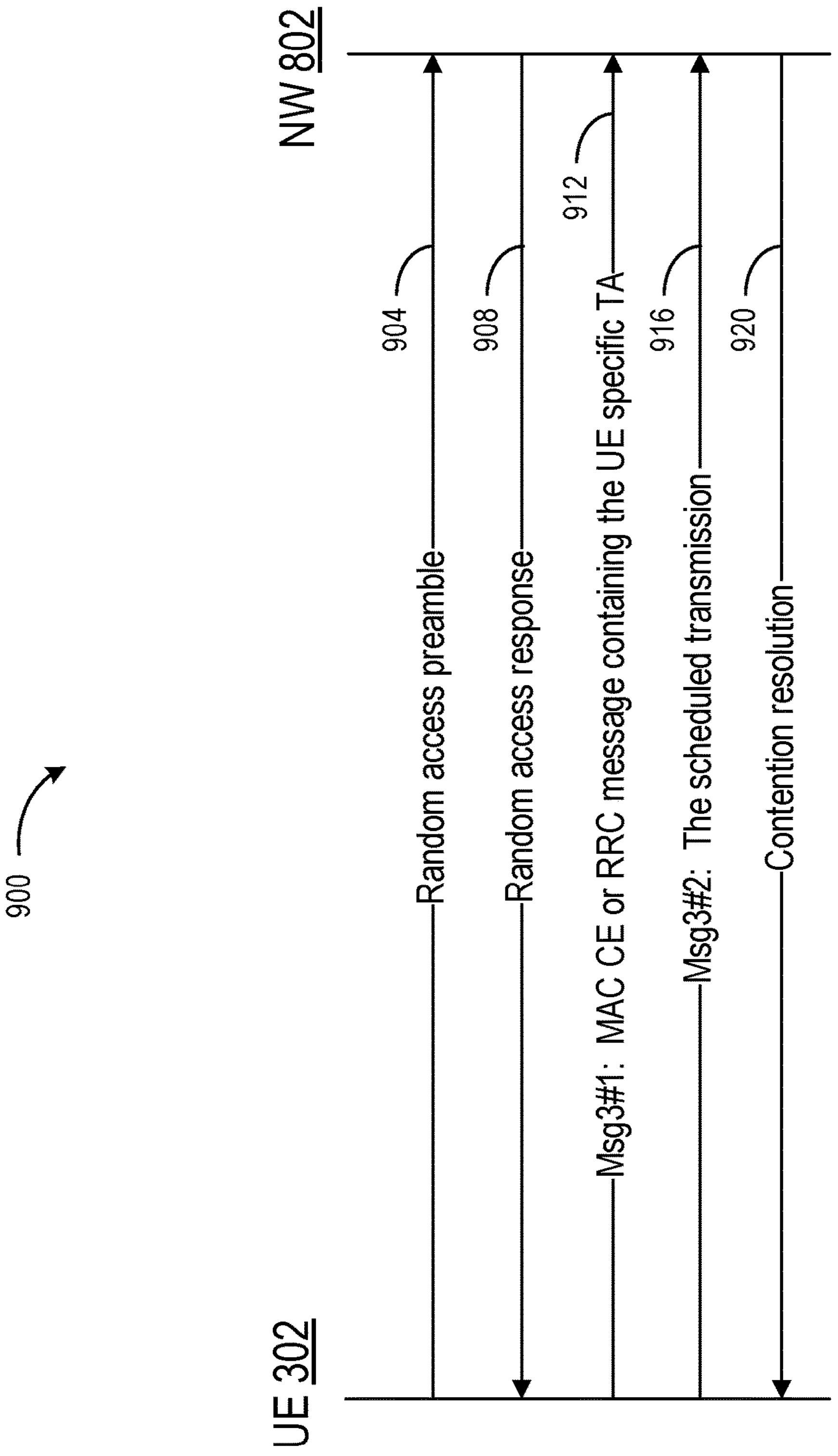

Referring to FIG. 9, a second example of message transmission containing the UE-specific TA (900), in accordance with some embodiments of the present disclosure. In some implementations, the first MSG3 can be the first MAC CE or RRC message including the UE-specific TA, and the second MSG3 can carry/include the content of the original first schedule transmission of RA procedure. For example, the UE 302 can transmit the RA preamble to the NW 802 (904). The NW 802 can transmit an RA response to the UE 302 upon receiving the RA preamble (908). In this case, the UE 302 can transmit a first MSG3, which can be a MAC CE or RRC message including the UE-specific TA (912). Concurrent or in response to transmitting the first MSG3, the UE 302 can transmit a second MSG3 including the content of the scheduled transmission of the RA procedure (916). In some cases, the first and second MSG3 may correspond to or be a part of a single MSG3. The UE 302 can monitor for contention resolution. Upon receiving MSG3 from the UE

302, the NW 802 can transmit contention resolution (e.g., response message) to the UE 302 (920).

Example Option 2 for Reporting UE-Specific TA Value

In some implementations, the UE 302 can report the UE-specific TA via a new UL CCCH/CCCH1 message. For example, the existing UL CCCH message may have no room for the UE-specific TA report. In this case, in the new UL CCCH/CCCH1 message, the size of the UE ID part of the message can be reduced to allow room/allocated space for UE specific TA report. Accordingly, the UE 302 can report the UE-specific TA value to the BS 304 (or NW 802) via the new UL CCCH/CCCH1.

Example Option 3 for Reporting UE-Specific TA Value

In some implementations, the UE 302 can report the UE-specific TA via MSG5 (e.g., a new or different message). For example, the UE 302 can introduce a new information element in, but not limited to, RRCSetupComplete, RRCResumeComplete, or RRCReestablishmentComplete message. In some cases, the UE 302 can transmit MSG5 subsequent to other messages (e.g., MSG1, MSG2, MSG3, MSG4, etc.). In some other cases, the UE 302 can transmit MSG5 concurrent to or prior to one or more other messages.

Example Implementation for Enabling UE-Specific Timing Advance Report

The UE 302 can receive the indication to enable UE-specific timing advance report from the BS 304. The indication can be included in SIB1->servingCellConfigCommon->uplinkConfigCommon->initialUplinkBWP->rach-ConfigCommon. For instance, the BS 304 can transmit the indication via SIB1 to servingCellConfigCommon, to uplinkConfigCommon, to initialUplinkBWP, and/or to rach-ConfigCommon.

Example Implementation for Reporting the UE-Specific TA Value—Option 1

Figure 10:
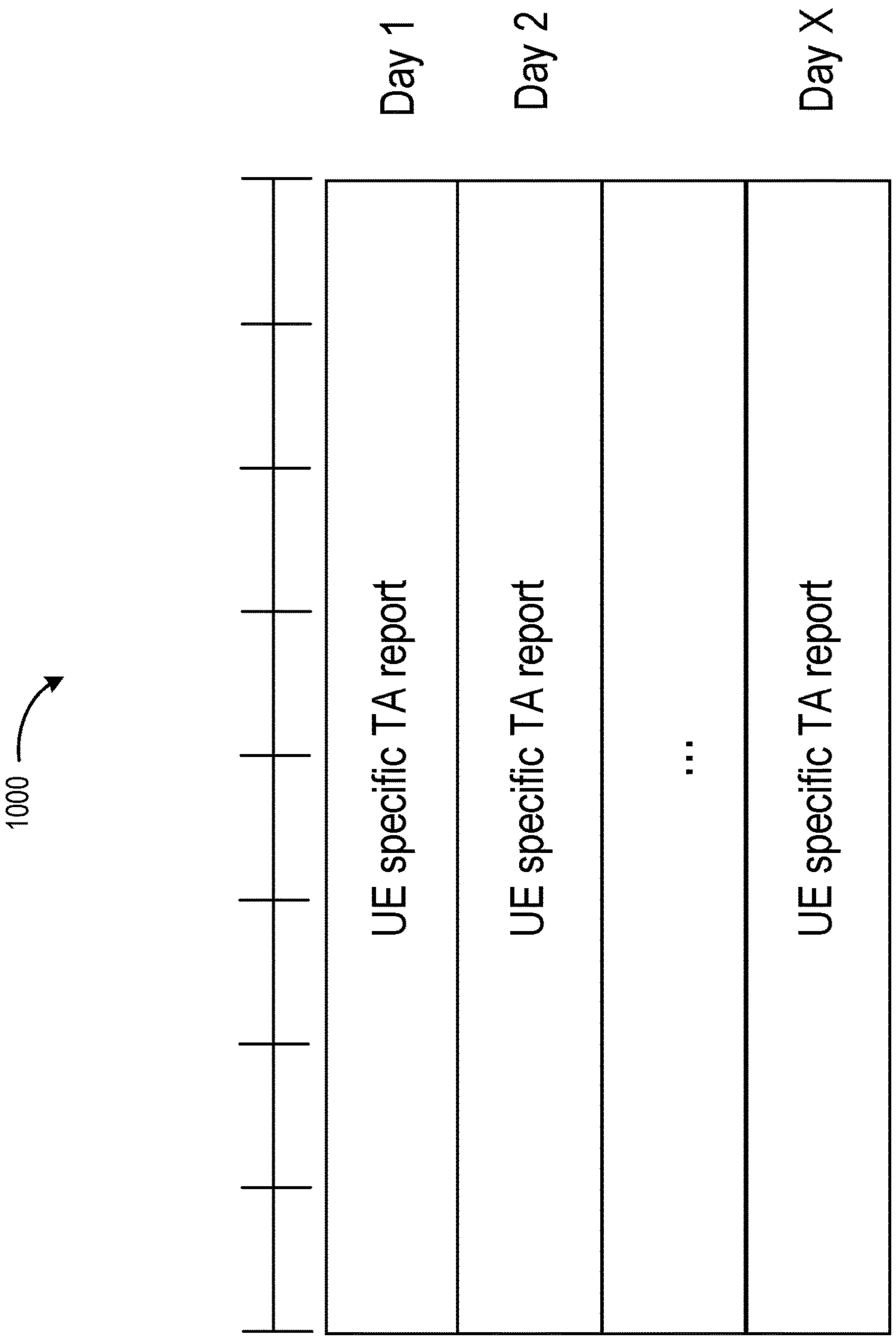
FIG. 10 illustrates an example UE-specific TA report MAC CE, in accordance with some embodiments of the present disclosure.

Referring to FIG. 10, depicted is an example UE-specific TA report MAC CE (1000), in accordance with some embodiments of the present disclosure. The example UE-specific TA report 1000 can include one or more UESpecificTAReport messages used to report the UE-specific TA value. The UE-specific TA report can be reported daily, weekly, monthly, etc. (e.g., day 1-N). For the UESpecificTAReport message, the signaling radio bearer can be SRB0, radio link control (RLC)-solution architecture and monetization platform (SAP) can be in transparent mode (TM), the logical channel can be CCCH, and the direction can be from UE 302 to NW 802, for example. The UE 302 can transmit one or more UESpecificTAReport messages to the NW 802. An example of the UESpecificTAReport message can be provided as follows:

```
UESpecificTAReport ::=          SEQUENCE {
  ueSpecificTAReport                 UESpecificTAReport-IEs
}
UESpecificTAReport-IEs ::=       SEQUENCE {
  timingAdvanceValue               INTEGER (..(2^XX)-1)
}
```

The INTEGER (0 . . . (2^XX)−1) can indicate that the index value TA (e.g., 0, 1, 2 . . . (2^XX)−1) is used to control the amount of timing adjustment at UE side, for example, as specified in certain systems.

Example Implementation for Reporting the UE-Specific TA Value—Option 2

In some implementations, the UE 302 can use RRCSetupRequest1 message to request the establishment of an RRC connection with the BS 304 (or other NWs 802). The RRCSetupRequest1 message can be a new message of size 48-bits, among other sizes. The RRCSetupRequest1 message can include signaling radio bearer: SRB0, RLC-SAP: TM, logical channel: CCCH, and direction: UE 302 to NW 802. An example of the RRCSetupRequest1 message can be as follows:

```
-- ASN1START
-- TAG-RRCSETUPREQUEST1-START
RRCSetupRequest1 ::=        SEQUENCE {
  rrcSetupRequest1                 RRCSetupRequest1-IEs
}
RRCSetupRequest1-IEs ::=    SEQUENCE {
  ue-Identity                    InitialUE-Identity,
establishmentCause           EstablishmentCause,
timingAdvanceValue              INTEGER (0..(2^XX)-1)//This indicates the index value
TA (0,1, 2... (2^XX)-1) used to control the amount of timing adjustment at UE side,as
specified in TS38.213.
  spare                         BIT STRING (SIZE (1))
}
InitialUE-Identity ::=      CHOICE {
  ng-5G-S-TMSI-Part1              BIT STRING (SIZE (39-XX)), //XX is the maximum
size of the bits required for the UE specific TA value transmission via MAC CE
randomValue               BIT STRING (SIZE (39-XX) //XX is the maximum size of the bits
required for the UE specific TA value transmission via MAC CE
}
EstablishmentCause ::=      ENUMERATED {
     emergency, highPriorityAccess, mt-Access, mo-Signalling,
     mo-Data, mo-VoiceCall, mo-VideoCall, mo-SMS, mps-PriorityAccess,
mcs-PriorityAccess,
     spare6, spare5, spare4, spare3, spare2, spare1}
-- TAG-RRCSETUPREQUEST-STOP
-- ASN1STOP
```

The characters "//" of the example code for the messages herein can represent or be followed by comments associated with the respective code line. Although an example of the message is provided, the UE 302 (or the BS 304 and NW 802) can transmit or receive other configuration/modification/parameters/scripts/texts of the message to perform features or functionalities, such as those discussed herein.

In some implementations, the UE 302 can use RRCResumeRequest2 message to request the resumption (e.g., resume) of a suspended RRC connection or perform an RNA update. The UE 302 can transmit the RRCResumeRequest2 message to the NW 802. For example, the RRCResumeRequest2 message can include Signalling radio bearer: SRB0, RLC-SAP: TM, Logical channel: CCCH, and Direction: UE 302 to Network 802. An example of RRCResumeRequest2 message can be as follows:

```
-- ASN1START
-- TAG-RRCRESUMEREQUEST2-START
RRCResumeRequest2 ::=           SEQUENCE {
    rrcResumeRequest2           RRCResumeRequest2-IEs
}
RRCResumeRequest2-IEs ::=       SEQUENCE {
  resumeIdentity            ShortI-RNTI-Value-Part1,
  resumeMAC-I               BIT STRING (SIZE (16)),
resumeCause                 ResumeCause,
timingAdvanceValue                INTEGER (0..(2^XX)−1)//This indicates the index value TA (0,1, 2...
(2^XX)−1) used to control the amount of timing adjustment at UE side,as specified in TS38.213.
  spare                     BIT STRING (SIZE (1))
}
ShortI-RNTI-Value-Part1 ::=     BIT STRING (SIZE(24-XX))//XX is the maximum size of the bits
required for the UE specific TA value transmission via MAC CE
-- TAG-RRCRESUMEREQUEST2-STOP
```

In some implementations, the UE 302 may use the RRCReestablishmentRequest1 message to request the reestablishment of an RRC connection. The UE 302 can use the RRCReestablishmentRequest1 message for transmission to the NW 802. The RRCReestablishmentRequest1 message can include signaling radio bearer: SRB0, RLC-SAP: TM, logical channel: CCCH, and direction: UE 302 to Network 802. An example of the RRCReestablishmentRequest1 message can be as follows:

```
-- ASN1START
-- TAG-RRCREESTABLISHMENTREQUEST1-START
RRCReestablishmentRequest1 ::=          SEQUENCE {
  rrcReestablishmentRequest1            RRCReestablishmentRequest1-IEs
}
RRCReestablishmentRequest1-IEs ::=          SEQUENCE {
  ue-Identity                   ReestabUE-Identity,
reestablishmentCause              ReestablishmentCause,
timingAdvanceValue                INTEGER (0..(2^XX)−1)//This indicates the index value TA (0, 1,
2... (2^XX)−1) used to control the amount of timing adjustment at UE side,as specified in TS38.213.
  spare                         BIT STRING (SIZE (1))
}
ReestabUE-Identity ::=          SEQUENCE {
  c-RNTI                        RNTI-Value,
  physCellId                    PhysCellId,
  shortMAC-I                    ShortMAC-I
}
ReestablishmentCause ::=                ENUMERATED {reconfigurationFailure, handoverFailure,
otherFailure, spare1}
I-RNTI-Value-Part1 ::=                  BIT STRING (SIZE(40-XX))//XX is the maximum size of the
bits required for the UE specific TA value transmission via MAC CE
-- TAG-RRCREESTABLISHMENTREQUEST-STOP
-- ASN1STOP
```

In some implementations, the UE 302 can use RRCSetupRequest1 message to request the establishment of an RRC connection to the NW 802. The RRCSetupRequest1 message can include signaling radio bearer: SRB0, RLC-SAP: TM, logical channel: CCCH1, and direction: UE 302 to Network 802. An example of the RRCSetupRequest1 message can be as follows:

```
-- ASN1START
-- TAG-RRCSETUPREQUEST1-START
RRCSetupRequest1 ::=                SEQUENCE {
```

-continued

```
  rrcSetupRequest1                RRCSetupRequest1-IEs
}
RRCSetupRequest1-IEs ::=            SEQUENCE {
  ue-Identity                InitialUE-Identity,
establishmentCause                EstablishmentCause,
timingAdvanceValue                INTEGER (0..(2^XX)-1)//This indicates the index value TA (0, 1,
2... (2^XX)-1) used to control the amount of timing adjustment at UE side,as specified in
TS38.213.The maximum size of the timingAdvanceValue field is 16 bits (i.e.XX<=16)as the CCCH1
message is of size 64 bits while the CCCH message is of size 48 bits.
  spare                BIT STRING (SIZE (1))
}
InitialUE-Identity ::=            CHOICE {
  ng-5G-S-TMSI-Part1                BIT STRING (SIZE (39)),
randomValue                BIT STRING (SIZE (39-(2))
}
EstablishmentCause ::=            ENUMERATED {
     emergency, highPriorityAccess, mt-Access, mo-Signalling,
     mo-Data, mo-VoiceCall, mo-VideoCall, mo-SMS, mps-PriorityAccess,
mcs-PriorityAccess,
     spare6, spare5, spare4, spare3, spare2, spare 1}
-- TAG-RRCSETUPREQUEST-STOP
-- ASN1STOP
```

In some implementation, the UE 302 can use an RRCResumeRequest2 message to request the resumption of a suspended RRC connection or perform an RNA update. The UE 302 can transmit the RRCResumeRequest2 message to the NW 802. The RRCResumeRequest2 message may include signaling radio bearer: SRB0, RLC-SAP: TM, logical channel: CCCH1, and direction: UE 302 to NW 802. An example of the RRCResumeRequest2 message can be as follows:

```
-- ASN1START
-- TAG-RRCRESUMEREQUEST2-START
RRCResumeRequest2 ::=            SEQUENCE {
     rrcResumeRequest2            RRCResumeRequest2-IEs
}
RRCResumeRequest2-IEs ::=            SEQUENCE {
  resumeIdentity                ShortI-RNTI-Value,
  resumeMAC-I                BIT STRING (SIZE (16)),
resumeCause                ResumeCause,
timingAdvanceValue                INTEGER (0..(2^XX)-1)//This indicates the index value TA (0, 1,
2... (2^XX)-1) used to control the amount of timing adjustment at UE side,as specified in
TS38.213.The maximum size of the timingAdvanceValue field is 16 bits (i.e.XX <= 16)as the CCCH1
message is of size 64 bits while the CCCH message is of size 48 bits.
  spare                BIT STRING (SIZE (1))
}
ShortI-RNTI-Value ::=            BIT STRING (SIZE(24))
-- TAG-RRCRESUMEREQUEST2-STOP
```

In some implementations, the UE 302 can use an RRCResumeRequest3 message to request the resumption of a suspended RRC connection or perform an RNA update. The UE 302 can transmit the RRCResumeRequest3 message to the NW 802. The RRCResumeRequest3 message may include signaling radio bearer: SRB0, RLC-SAP: TM, logical channel: CCCH1, and direction: UE 302 to NW 802. An example of the RRCResumeRequest3 message can be as follows:

```
-- ASN1START
-- TAG-RRCRESUMEREQUEST3-START
RRCResumeRequest3 ::=            SEQUENCE {
     rrcResumeRequest3            RRCResumeRequest3-IEs
}
RRCResumeRequest3-IEs ::=      SEQUENCE {
  resumeIdentity            I-RNTI-Value-Part1,
  resumeMAC-I            BIT STRING (SIZE (16)),
  resumeCause            ResumeCause,
timingAdvanceValue                INTEGER (0..(2^XX)-1)//This indicates the index value TA (0, 1,
2... (2^XX)-1) used to control the amount of timing adjustment at UE side,as specified in
TS38.213.The maximum size of the timingAdvanceValue field is 16 bits (i.e.XX<=16)as the CCCH1
message is of size 64 bits while the CCCH message is of size 48 bits.
  spare                BIT STRING (SIZE (1))
```

-continued

```
}
I-RNTI-Value-Part1 ::=                BIT STRING (SIZE(40-XX))//XX is the maximum size of
the bits required for the UE specific TA value transmission via MAC CE
-- TAG-RRCRESUMEREQUEST3-STOP
-- ASN1STOP
```

In some implementation, the UE 302 can use an RRCReestablishmentRequest1 message to request the reestablishment of an RRC connection. The UE 302 can transmit the RRCReestablishmentRequest1 message to the NW 802. The RRCReestablishmentRequest1 message can include signaling radio bearer: SRB0, RLC-SAP: TM, logical channel: CCCH1, and direction: UE 302 to NW 802. An example of the RRCReestablishmentRequest1 message can be as follows:

```
-- ASN1START
-- TAG-RRCREESTABLISHMENTREQUEST1-START
RRCReestablishmentRequest1 ::= SEQUENCE {
   rrcReestablishmentRequest1                RRCReestablishmentRequest1-IEs
}
RRCReestablishmentRequest1-IEs ::= SEQUENCE {
   ue-Identity                ReestabUE-Identity,
reestablishmentCause                ReestablishmentCause,
timingAdvanceValue                INTEGER (0..(2^XX)−1)//This indicates the index value TA (0, 1,
2... (2^XX)−1) used to control the amount of timing adjustment at UE side,as specified in
TS38.213.The maximum size of the timingAdvanceValue field is 16 bits (i.e.XX<=16)as the CCCH1
message is of size 64 bits while the CCCH message is of size 48 bits.
   spare                BIT STRING (SIZE (1))
}
ReestabUE-Identity ::=                SEQUENCE {
   c-RNTI                RNTI-Value,
   physCellId                PhysCellId,
   shortMAC-I                ShortMAC-I
}
ReestablishmentCause ::=                ENUMERATED {reconfigurationFailure, handoverFailure,
otherFailure, spare1}
I-RNTI-Value-Part1 ::=                BIT STRING (SIZE(40-XX))//XX is the maximum size of
the bits required for the UE specific TA value transmission via MAC CE?
-- TAG-RRCREESTABLISHMENTREQUEST-STOP
-- ASN1STOP
```

Example Implementation for Reporting the UE-Specific TA Value—Option 3

In some implementation, the UE 302 can use an RRCSetupComplete message to confirm the completion (e.g., successful completion or status of the completion) of an RRC connection establishment. The UE 302 can transmit the RRCSetupComplete message to the NW 802. The RRCSetupComplete message can include signaling radio bearer: SRB1, RLC-SAP: acknowledgment mode (AM), logical channel: DCCH, and direction: UE 302 to NW 802. An example of the RRCSetupComplete message can be as follows:

```
-- ASN1START
-- TAG-RRCSETUPCOMPLETE-START
RRCSetupComplete ::=                SEQUENCE {
   rrc-TransactionIndentifier                RRC-TransactionIdentifier,
   criticalExtensions                CHOICE {
      rrcSetupComplete                RRCSetupComplete-IEs,
      criticalExtensionsFuture                SEQUENCE { }
   }
}
RRCSetupComplete-IEs ::=                SEQUENCE {
   selectedPLMN-Identity                INTEGER (1..maxPLMN),
   registeredAMF                RegisteredAMF                OPTIONAL,
   guamt-Type                ENUMERATED {native, mapped}                OPTIONAL,
   s-NSSAI-List                SEQUENCE (SIZE (1..maxNrofS-NSSAI)) OF S-NSSAI
OPTIONAL,
   dedicatedNAS-Message                DedicatedNAS-Message,
   ng-5G-S-TMSI-Value                CHOICE {
      ng-5G-S-TMSI                NG-5G-S-TMSI,
      ng-5G-S-TMSI-Part2                BIT STRING (SIZE (9))
   }                OPTIONAL,
   lateNonCriticalExtension                OCTET STRING                OPTIONAL,
```

-continued

```
  nonCriticalExtension               RRCSetupComplete-v1610-IEs           OPTIONAL
}
RRCSetupComplete-v1610-IEs ::=                  SEQUENCE {
  iab-NodeIndication-r16            ENUMERATED {true}               OPTIONAL,
  idleMeasAvailable-r16             ENUMERATED {true}               OPTIONAL,
  ue-MeasurementsAvailable-r16               UE-MeasurementsAvailable-r16     OPTIONAL,
  mobilityHistory Avail-r16      ENUMERATED {true}                 OPTIONAL,
  mobilityState-r16                ENUMERATED {normal, medium, high, spare}        OPTIONAL,
  nonCriticalExtension               RRCSetupComplete-v17xy-IEs
OPTIONAL
}
RRCSetupComplete-v17xy-IEs ::=                  SEQUENCE {
timingAdvanceValue              INTEGER (0..(2^XX)-1)//This indicates the index value TA (0, 1,
2... (2^XX)-1) used to control the amount of timing adjustment at UE side,as specified in TS38.213.
  nonCriticalExtension               SEQUENCE{ }                 OPTIONAL
}
-- TAG-RRCSETUPCOMPLETE-STOP
-- ASN1STOP
```

In some implementation, the UE 302 can use an RRCResumeComplete message to confirm the successful completion (e.g., completion status) of an RRC connection resumption. The UE 302 can transmit the RRCResumeComplete message to the NW 802. The RRCResumeComplete message can include signaling radio bearer: SRB1, RLC-SAP: AM, logical channel: DCCH, and direction: UE 302 to NW 802. An example of the RRCResumeComplete message can be as follows:

```
-- ASN1START
-- TAG-RRCRESUMECOMPLETE-START
RRCResumeComplete ::=                  SEQUENCE {
  rrc-TransactionIdentifier              RRC-TransactionIdentifier,
  criticalExtensions                  CHOICE {
    rrcResumeComplete                           RRCResumeComplete-IEs,
    criticalExtensionsFuture                       SEQUENCE { }
  }
}
RRCResumeComplete-IEs ::=                        SEQUENCE {
  dedicatedNAS-Message                          DedicatedNAS-Message
OPTIONAL,
  selectedPLMN-Identity                  INTEGER (1..maxPLMN)
OPTIONAL,
  uplinkTxDirectCurrentList                       UplinkTxDirectCurrentList
OPTIONAL,
  lateNonCriticalExtension               OCTET STRING
OPTIONAL,
  nonCriticalExtension                 RRCResumeComplete-v1610-IEs
OPTIONAL
}
RRCResumeComplete-v1610-IEs ::=                       SEQUENCE {
  idleMeasAvailable-r16               ENUMERATED {true}
OPTIONAL,
  measResultIdleEUTRA-r16                          MeasResultIdleEUTRA-r16
OPTIONAL,
  measResultIdleNR-r16                 MeasResultIdleNR-r16
OPTIONAL,
scg-Response-r16                    CHOICE {
    nr-SCG-Response                           OCTET STRING (CONTAINING
RRCReconfigurationComplete),
    eutra-SCG-Response                          OCTET STRING
  }                                                  OPTIONAL,
  ue-MeasurementsAvailable-r16                         UE-MeasurementsAvailable-r16
OPTIONAL,
  mobilityHistoryAvail-r16               ENUMERATED {true}
OPTIONAL,
  mobilityState-r16                 ENUMERATED {normal, medium, high, spare}
OPTIONAL,
  needForGapsInfoNR-r16                         NeedForGapsInfoNR-r16
OPTIONAL,
  nonCriticalExtension                 RRCResumeComplete-v1640-IEs
OPTIONAL
}
RRCResumeComplete-v1640-IEs ::=                       SEQUENCE {
  uplinkTxDirectCurrentTwoCarrierList-r16 UplinkTxDirectCurrentTwoCarrierList-r16
OPTIONAL,
  nonCriticalExtension                 RRCResumeComplete-v17xy-IEs
OPTIONAL
}
```

-continued

```
RRCResumeComplete-v17xy-IEs ::=                SEQUENCE {
timingAdvanceValue              INTEGER (0..(2^XX)-1)//This indicates the index value TA (0, 1,
2... (2^XX)-1) used to control the amount of timing adjustment at UE side,as specified in TS38.213.
  nonCriticalExtension                SEQUENCE { }
OPTIONAL
}
-- TAG-RRCRESUMECOMPLETE-STOP
-- ASN1STOP
```

In some cases, the one or more example messages can include optional data/message/step/text/code. For example, data (e.g., one or more lines) of the example messages prior to an “OPTIONAL” statement/indication may be removed/discarded/hidden from the message. In another example, the data presented after the “OPTIONAL” indication may be removed from the message. In some implementations, the message may include at least one or all of the optional data in the message.

In some implementation, the UE 302 can use an RRCReestablishmentComplete message to confirm the successful completion of an RRC connection re-establishment. For example, the UE 302 can transmit the RRCReestablishmentComplete message to the NW 802 to confirm completion of the RRC connection re-establishment. The RRCReestablishmentComplete message can include signaling radio bearer: SRB1, RLC-SAP: AM, logical channel: DCCH, and direction: UE 302 to NW 802. An example of the RRCReestablishmentComplete message can be as follows:

Referring now to operation (1105), and in some implementations, a wireless communication node (e.g., gNB, BS, or NW) may send/transmit/forward/provide a first message to the wireless communication device (e.g., UE or client device). In response to transmitting the first message, the wireless communication device can receive the first message from the wireless communication node (1110). The wireless communication device can receive the first message to enable sending a UE specific TA value to the wireless communication node. In some implementations, the first message may be included/embedded in at least one of a System Information Block 1 (SIB1), an RRCSetup message, an RRCResume message, or an RRCReestablishment message.

Referring to operation (1115), in response to receiving the first message, the wireless communication device can send/transmit a second message to the wireless communication node. The second message can include a report (e.g., UE-specific TA report) including the UE-specific TA value. The

```
-- ASN1START
-- TAG-RRCREESTABLISHMENTCOMPLETE-START
RRCReestablishmentComplete ::=                SEQUENCE {
  rrc-TransactionIdentifier              RRC-TransactionIdentifier,
  criticalExtensions                   CHOICE {
    rrcReestablishmentComplete             RRCReestablishmentComplete-IEs,
    criticalExtensionsFuture             SEQUENCE { }
  }
}
RRCReestablishmentComplete-IEs ::=              SEQUENCE {
  lateNonCriticalExtension              OCTET STRING                 OPTIONAL,
  nonCriticalExtension                RRCReestablishmentComplete-v1610-IEs       OPTIONAL
}
RRCReestablishmentComplete-v1610-IEs ::=                SEQUENCE {
  ue-MeasurementsAvailable-r16               UE-MeasurementsAvailable-r16     OPTIONAL,
  nonCriticalExtension                RRCReestablishmentComplete-v17xy-IEs
OPTIONAL
}
RRCReestablishmentComplete-v17xy-IEs ::=                SEQUENCE {
timingAdvanceValue              INTEGER (0..(2^XX)-1)//This indicates the index value TA (0, 1,
2... (2^XX)-1) used to control the amount of timing adjustment at UE side,as specified in TS38.213.
  nonCriticalExtension                SEQUENCE { }               OPTIONAL
}
-- TAG-RRCREESTABLISHMENTCOMPLETE-STOP
-- ASN1STOP
```

Figure 11:
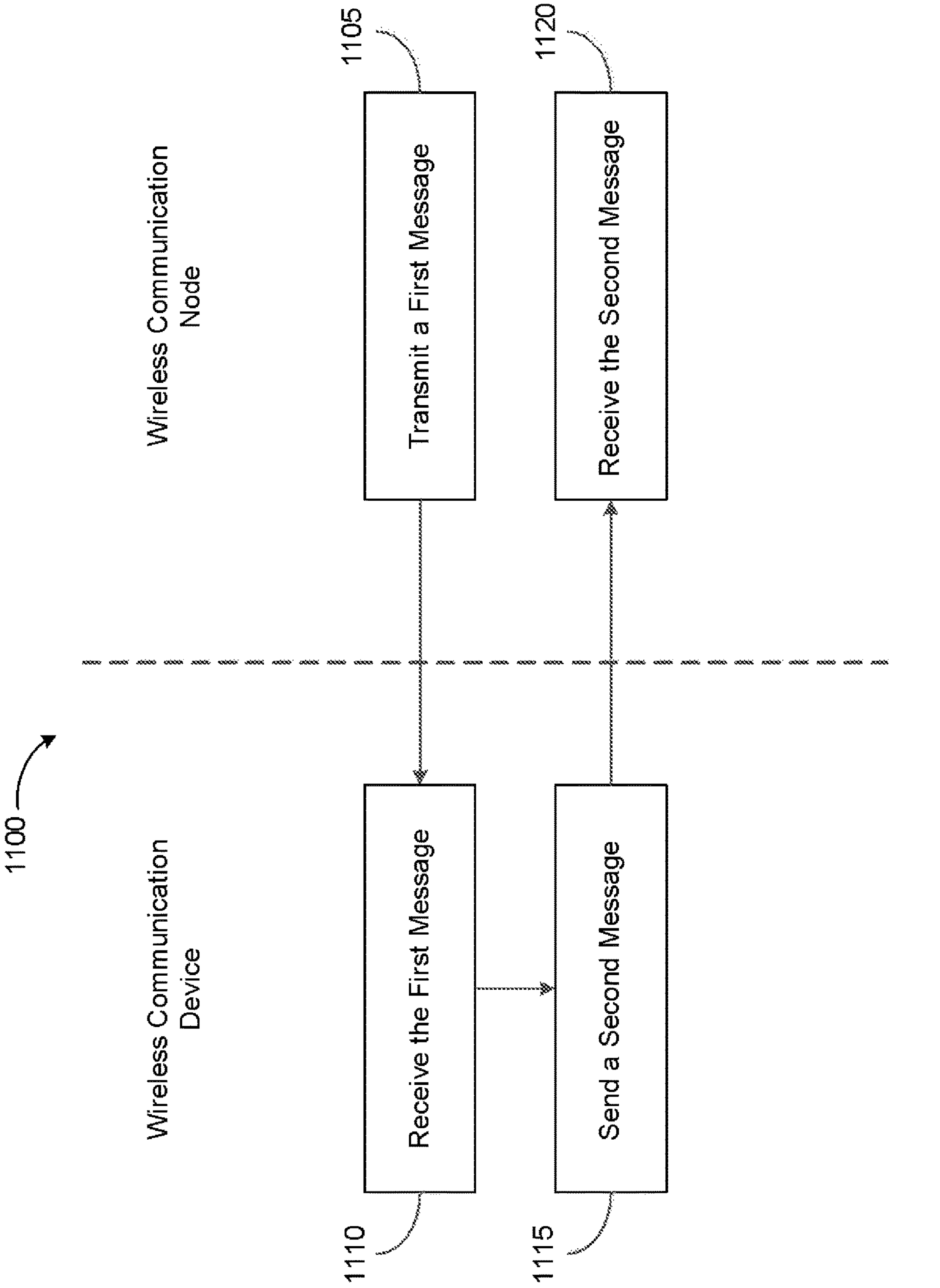
FIG. 11 illustrates a flow diagram of an example method for enhanced random access procedure, in accordance with an embodiment of the present disclosure.

Referring to FIG. 11, a flow diagram of an example method 1100 for enhanced random access procedure is shown, in accordance with an embodiment of the present disclosure. The method 1100 may be implemented using any of the components and devices detailed herein in conjunction with at least FIGS. 1-10. In overview, the method 1100 may include transmitting a first message (1105). The method 1100 may include receiving the first message (1110). The method 1100 may include sending a second message (1115). The method 1100 may include receiving the second message (1120).

wireless communication node can receive the second message from the wireless communication device in response to the transmission (1120).

In some implementations, the wireless communication device may send the second message to the wireless communication node prior to a contention resolution (e.g., MSG4 or MSGB) of a RA procedure. The contention resolution of the RA procedure can be between the wireless communication device and the wireless communication node. For example, the wireless communication device can transmit the second message via at least one of a MAC CE or a UL CCCH. In some implementations, the wireless communication device can send a third message (e.g., MSG3) prior to or subsequent to sending the second message. The third message may include a scheduled transmission for the RA procedure.

In some implementations, the wireless communication device can send the second message to the wireless communication node prior to a contention resolution of a RA procedure between the wireless communication device and the wireless communication node. The size of a portion of the second message that contains UE ID may be reduced (e.g., to allow/allocate room/space for UE-specific TA report). For example, the second message may be transmitted via at least one of a UL CCCH or a UP CCCH1. In some cases, the second message may include at least one of an RRCSetupRequest1 message, an RRCResumeRequest2 message, or an RRCReestablishmentRequest1 message.

In some implementations, the wireless communication device can send the second message subsequently to a contention resolution of an RA procedure between the wireless communication device and the wireless communication node. For example, the second message may be transmitted via a Dedicated Control Channel (DCCH). In some cases, the second message may include at least one of an RRCSetupComplete message, an RRCResumeComplete message, or an RRCRestablishmentComplete message.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A wireless communication method, comprising:

receiving, by a wireless communication device from a wireless communication node, a first message, wherein the first message comprises an indication to enable sending a User Equipment (UE) specific timing advance (TA) value during random access (RA) procedure; and in response to receiving the first message, sending, by the wireless communication device to the wireless communication node, a Medium Access Control (MAC) Control Element (MAC-CE) corresponding to a logical channel ID (LCID) of a new code point or index containing the UE specific TA value.

2. A non-transitory computer-readable program medium having code stored thereupon, the code, when executed by at least one processor, causes the at least one processor to implement the wireless communication method of claim 1.

3. A wireless communication method, comprising:

transmitting, by a wireless communication node to a wireless communication device, a first message, wherein the first message comprises an indication to enable sending a User Equipment (UE) specific timing advance (TA) value during random access (RA) procedure; and subsequent to transmitting the first message, receiving, by the wireless communication node from the wireless communication device, a Medium Access Control (MAC) Control Element (MAC-CE) corresponding to a logical channel ID (LCID) of a new code point or index containing the UE specific TA value.

4. A non-transitory computer-readable program medium having code stored thereupon, the code, when executed by at least one processor, causes the at least one processor to implement the wireless communication method of claim 3.

5. A wireless communication device, comprising:

at least one processor configured to:

receive, via a transceiver from a wireless communication node, a first message, wherein the first message comprises an indication to enable sending a User Equipment (UE) specific timing advance (TA) value during random access (RA) procedure; and in response to receiving the first message, send, via the transceiver to the wireless communication node, a Medium Access Control (MAC) Control Element (MAC-CE) corresponding to a logical channel ID (LCID) of a new code point or index containing the UE specific TA value.

6. A wireless communication node, comprising:

at least one processor configured to:

transmit, via a transceiver to a wireless communication device, a first message, wherein the first message comprises an indication to enable sending a User Equipment (UE) specific timing advance (TA) value during random access (RA) procedure; and subsequent to transmitting the first message, receive, via the transceiver from the wireless communication device, a Medium Access Control (MAC) Control Element (MAC-CE) corresponding to a logical channel ID (LCID) of a new code point or index containing the UE specific TA value.

* * * * *